Dec. 5, 1961 L. P. FRIEDER ET AL 3,011,820
WEBBING CARGO NET
Filed Aug. 16, 1954 10 Sheets-Sheet 1

INVENTORS
LEONARD P. FRIEDER
WALTER S. FINKEN
BY
ATTORNEY

Dec. 5, 1961  L. P. FRIEDER ET AL  3,011,820
WEBBING CARGO NET
Filed Aug. 16, 1954  10 Sheets-Sheet 2
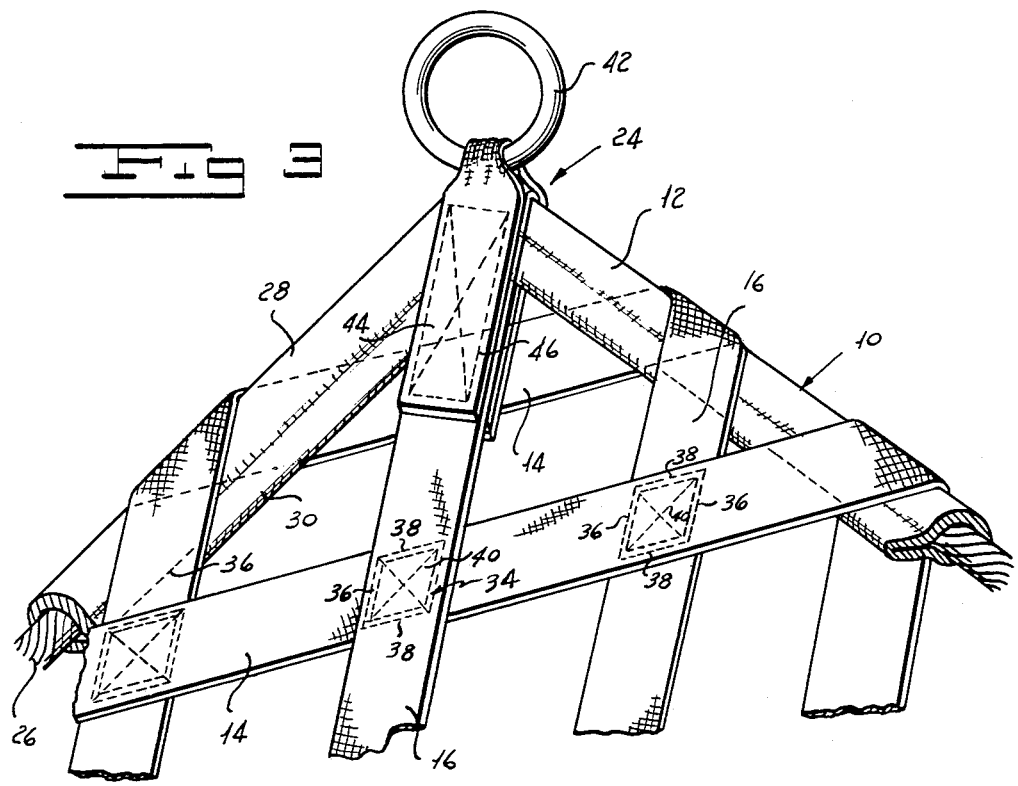
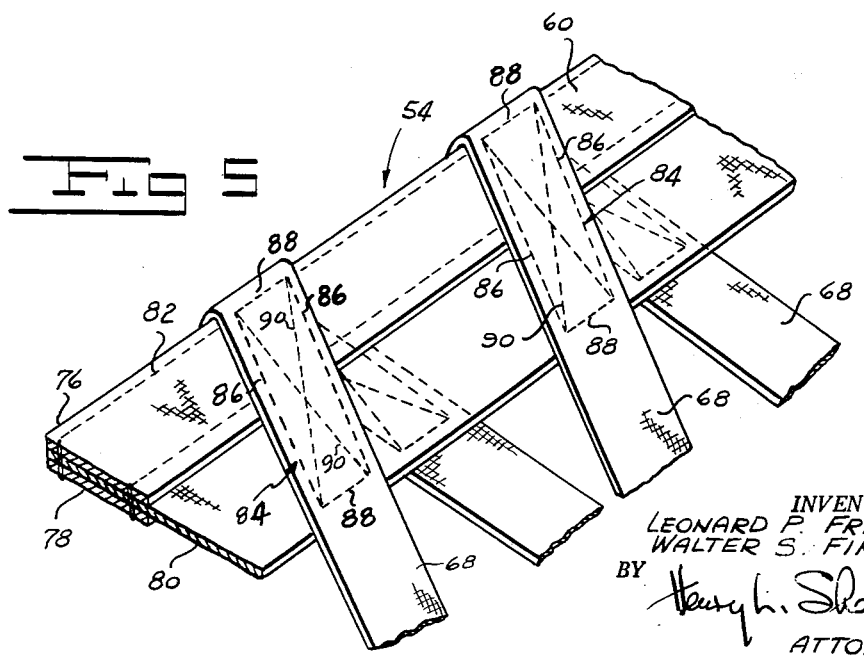
INVENTORS
LEONARD P. FRIEDER
WALTER S. FINKEN
BY
ATTORNEY

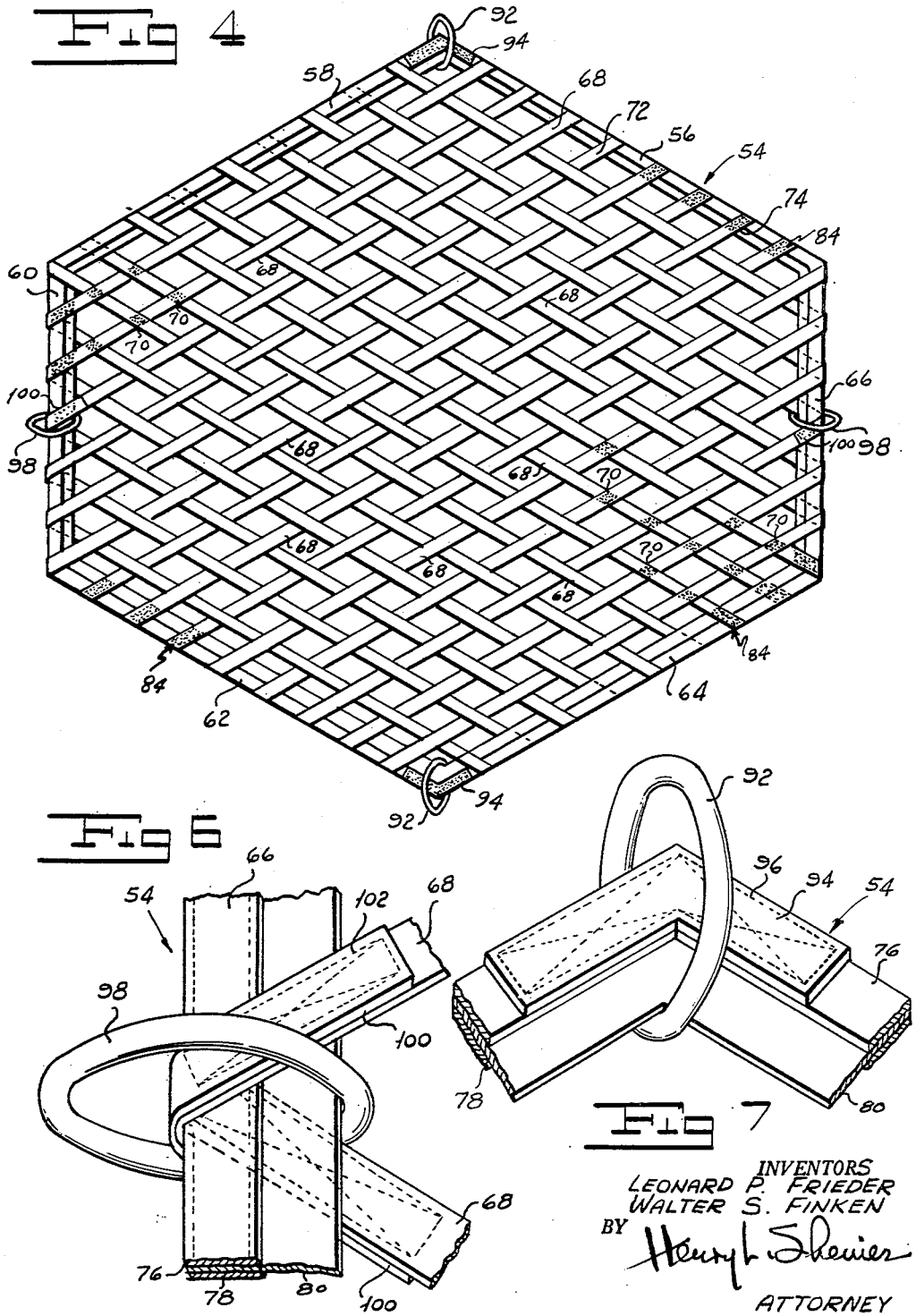

Dec. 5, 1961 L. P. FRIEDER ET AL 3,011,820
WEBBING CARGO NET
Filed Aug. 16, 1954 10 Sheets-Sheet 4
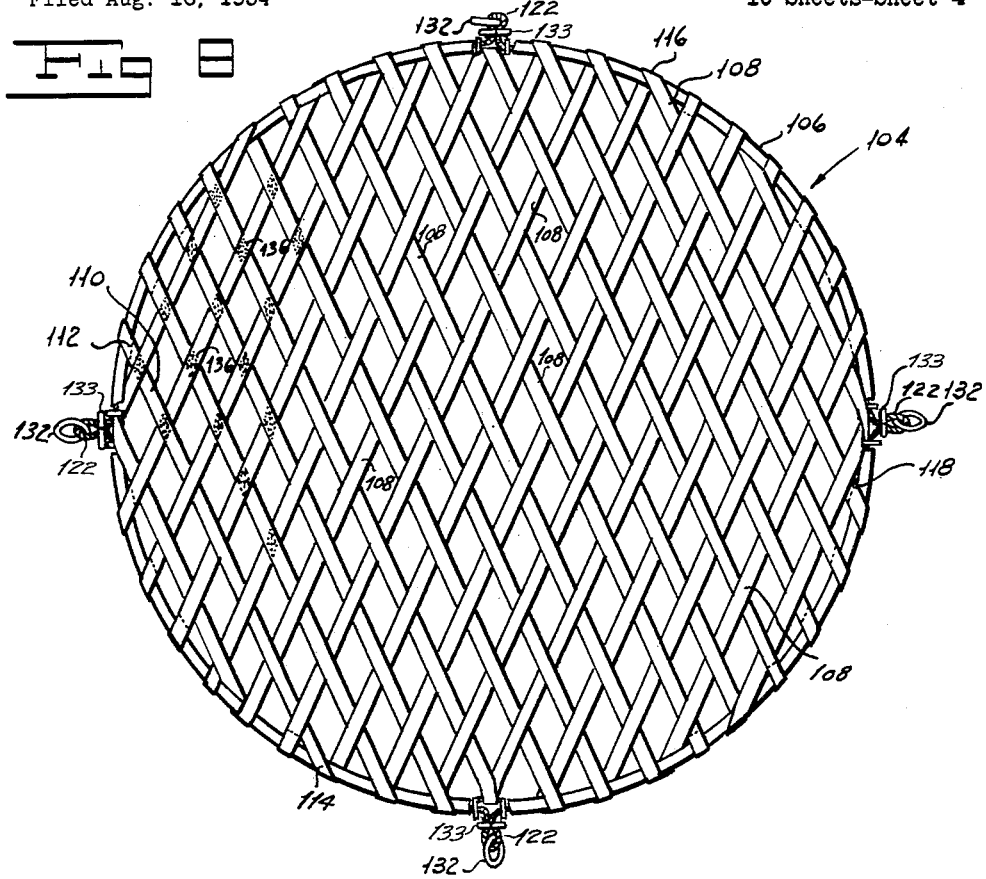
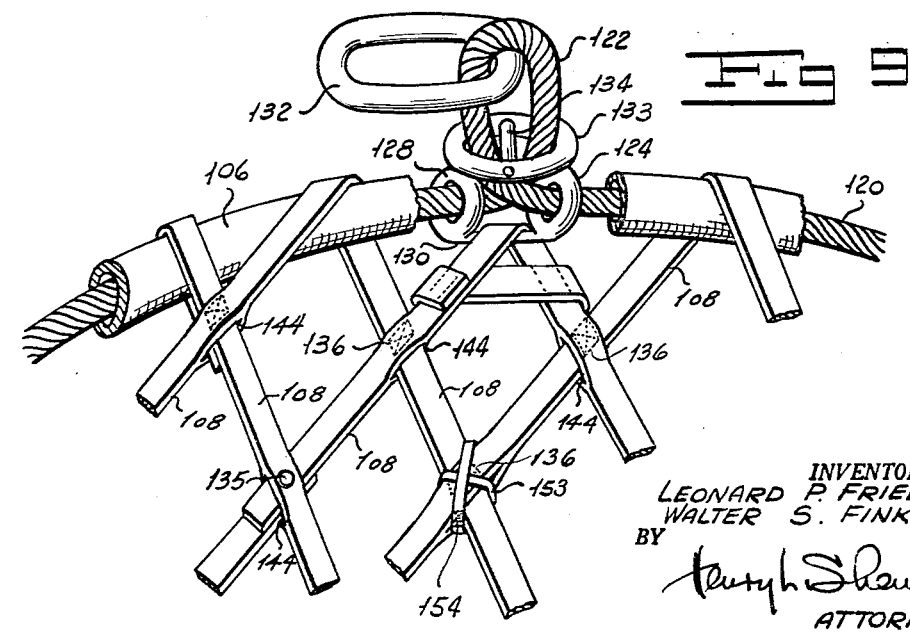
INVENTORS
LEONARD P. FRIEDER
WALTER S. FINKEN
BY
*Teury L. Shavier*
ATTORNEY Dec. 5, 1961  L. P. FRIEDER ET AL  3,011,820
WEBBING CARGO NET
Filed Aug. 16, 1954  10 Sheets-Sheet 5
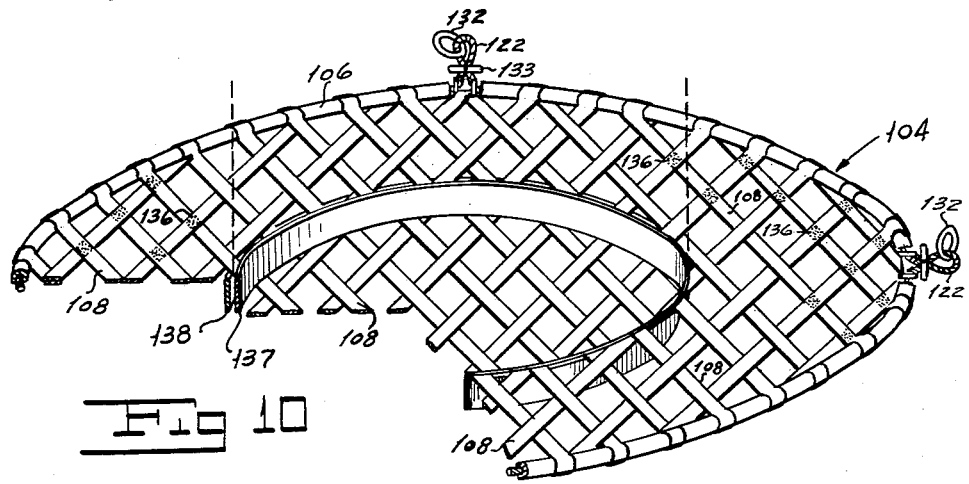
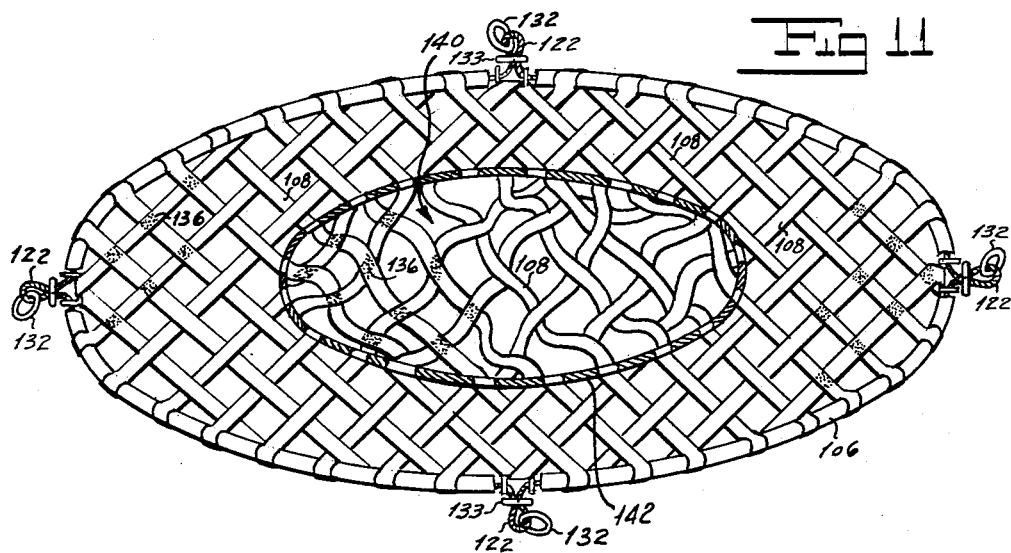
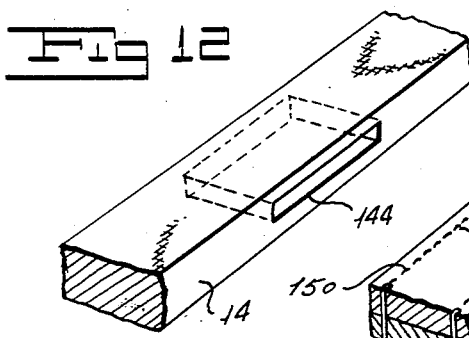
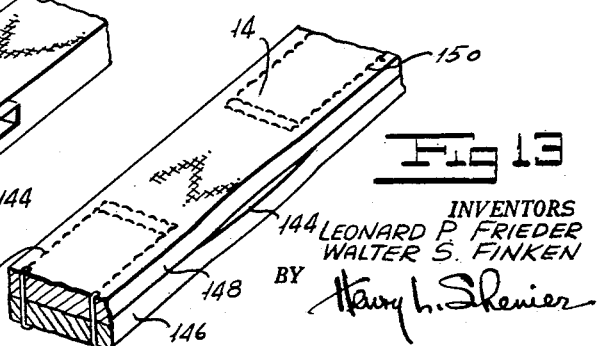
INVENTORS
LEONARD P. FRIEDER
WALTER S. FINKEN
BY Harry L. Shenier
ATTORNEY Dec. 5, 1961  L. P. FRIEDER ET AL  3,011,820
WEBBING CARGO NET
Filed Aug. 16, 1954  10 Sheets-Sheet 6
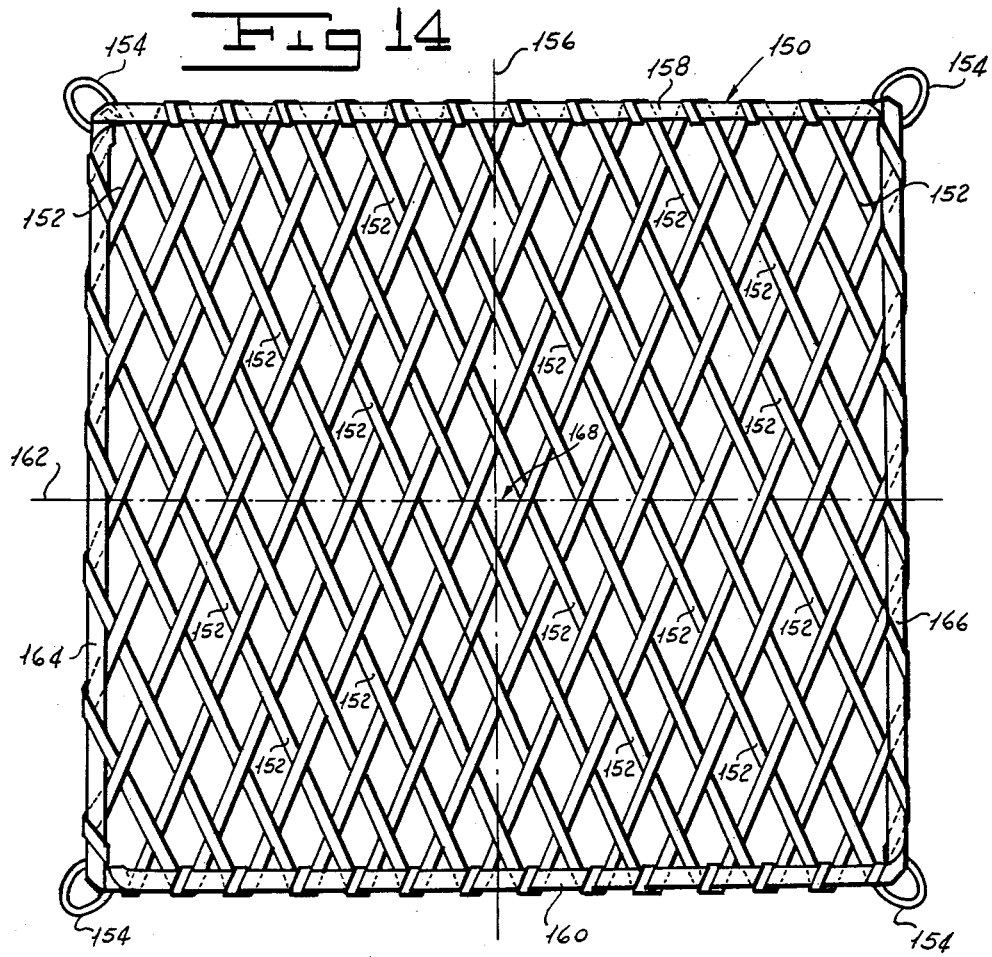
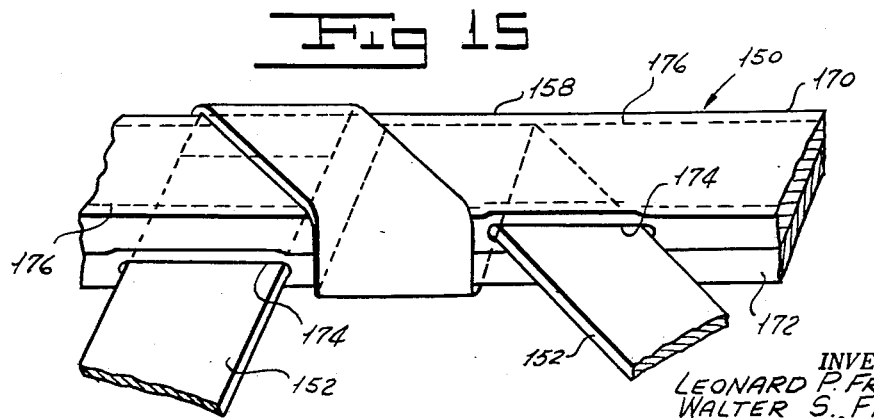
INVENTORS
LEONARD P. FRIEDER
WALTER S. FINKEN
BY Henry L. Shenier
ATTORNEY

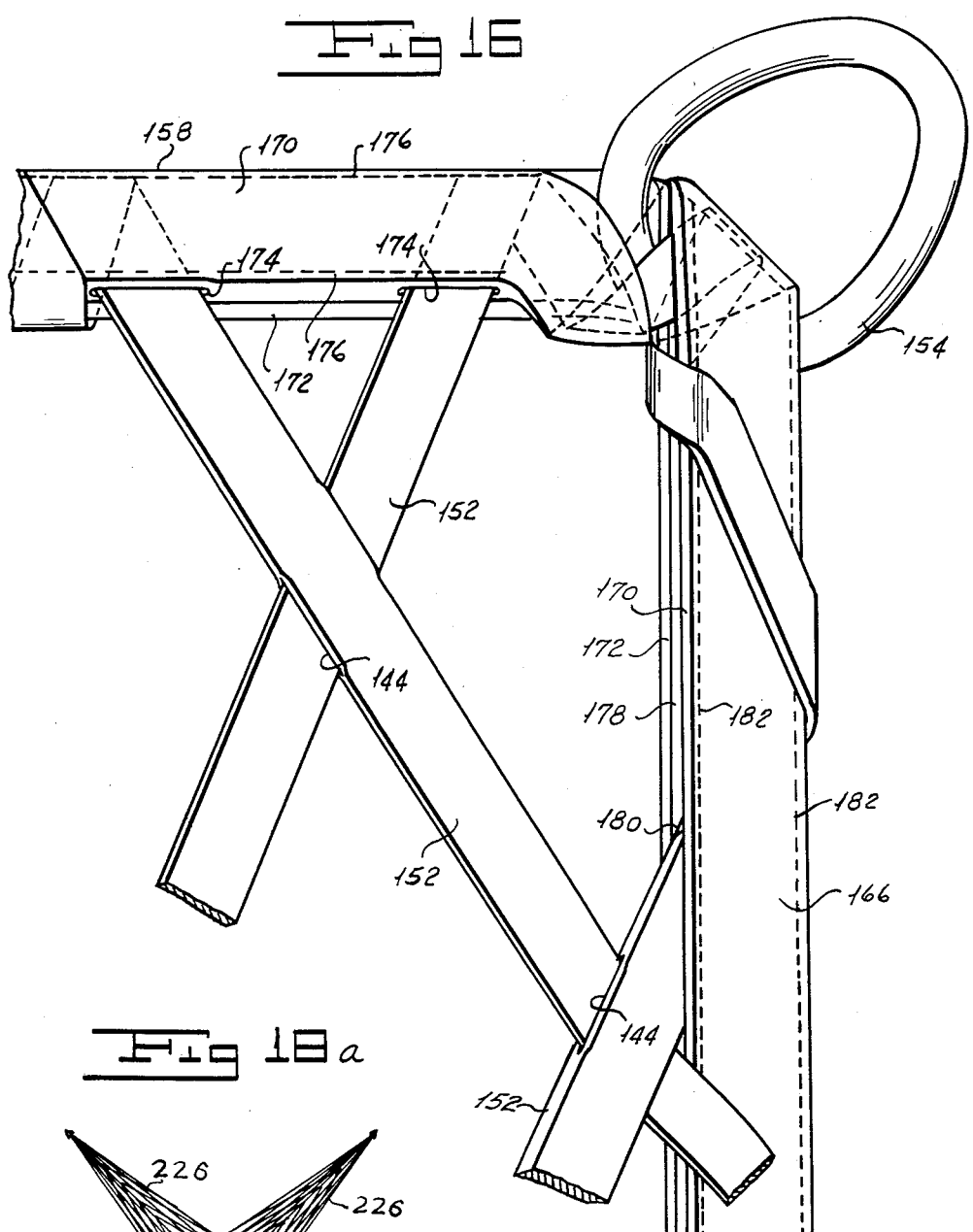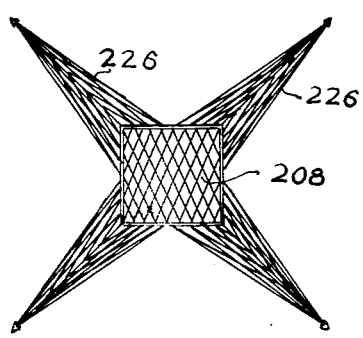

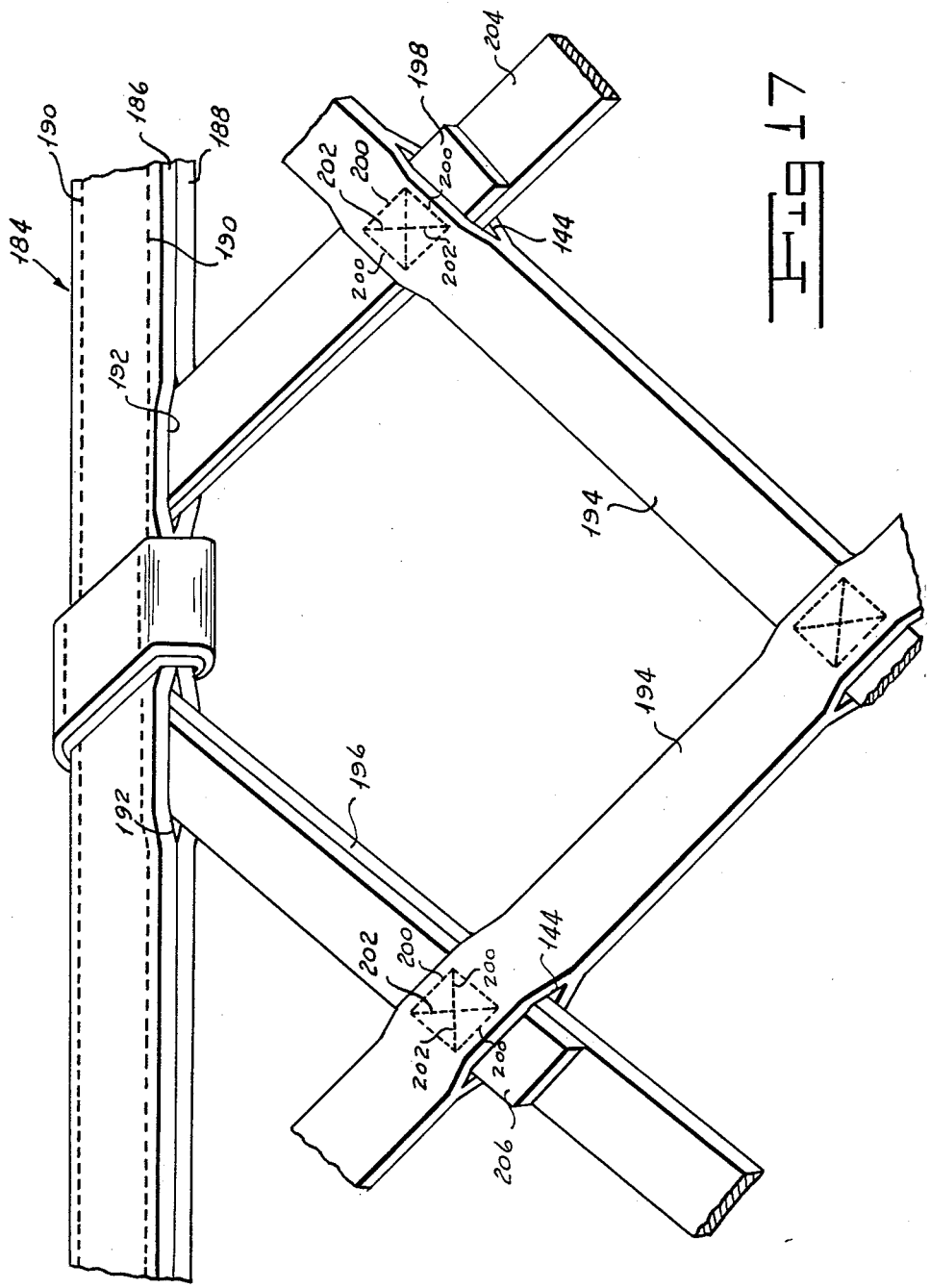

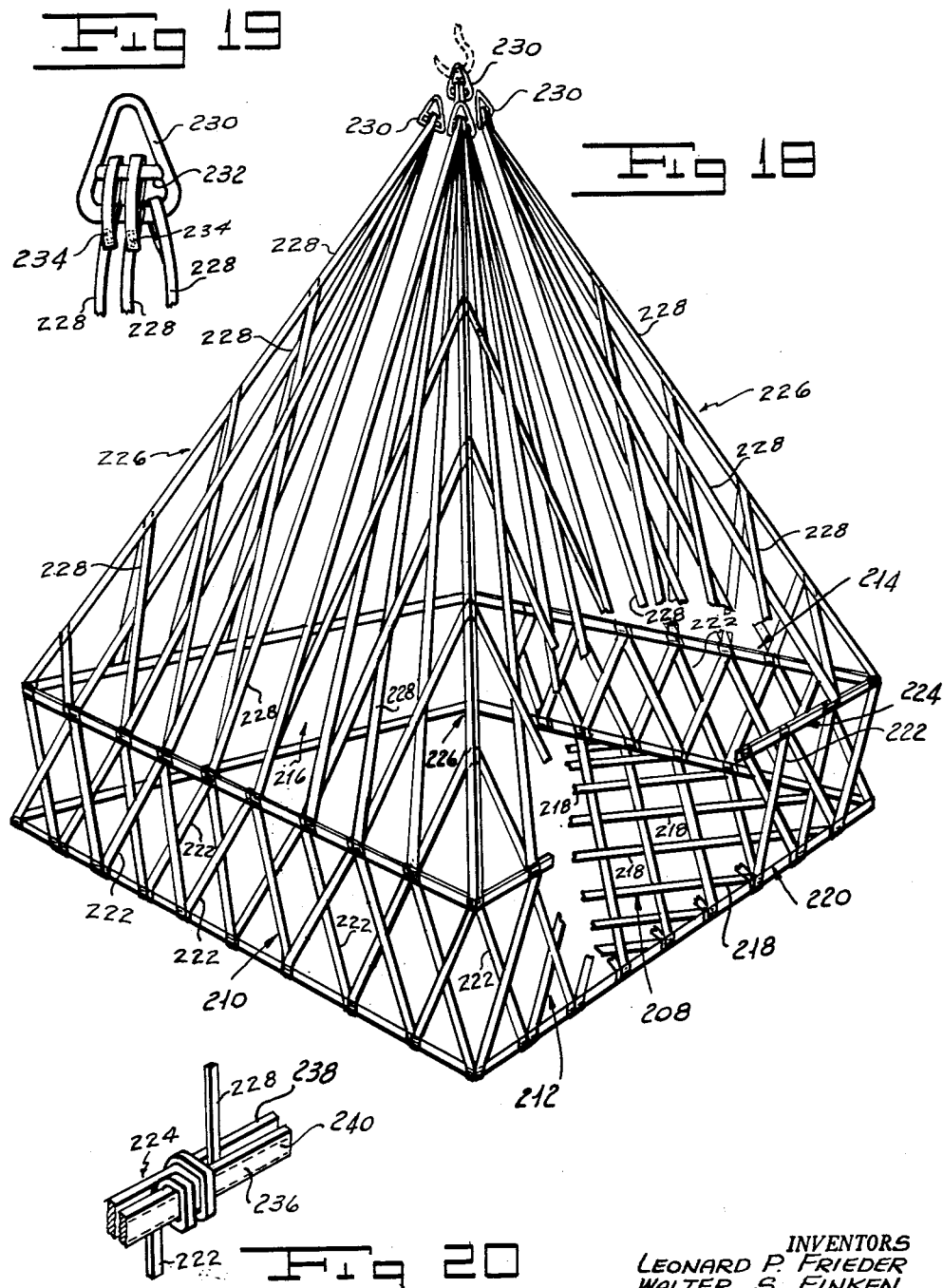

Dec. 5, 1961  L. P. FRIEDER ET AL  3,011,820
WEBBING CARGO NET
Filed Aug. 16, 1954  10 Sheets-Sheet 10
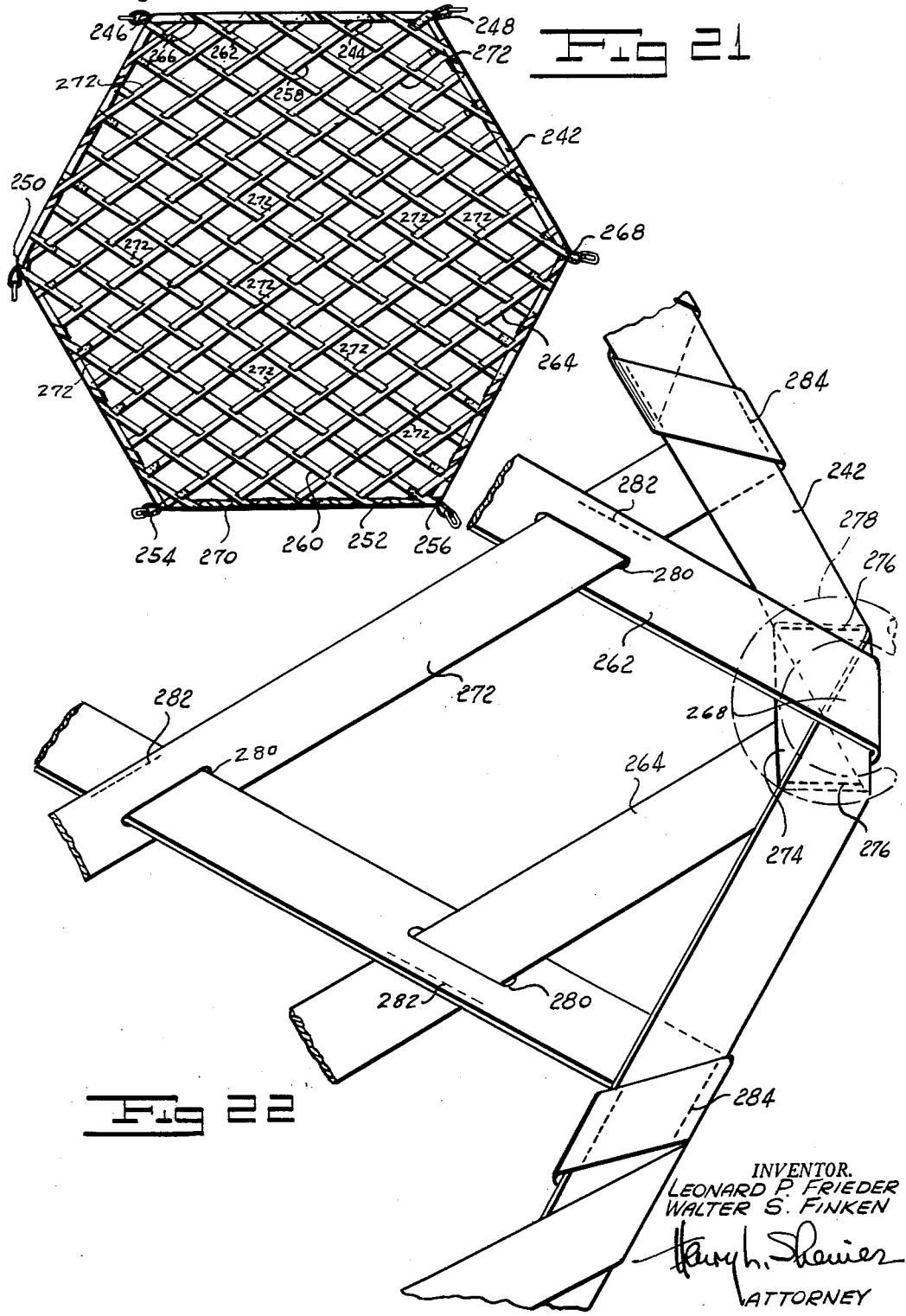
INVENTOR.
LEONARD P. FRIEDER
WALTER S. FINKEN
ATTORNEY

__ __

United States Patent Office 3,011,820
Patented Dec. 5, 1961

3,011,820
WEBBING CARGO NET
Leonard P. Frieder, 145 Station Road, Great Neck, N.Y., and Walter S. Finken, Brooklyn, N.Y., assignors to Leonard P. Frieder, Great Neck, N.Y.
Filed Aug. 16, 1954, Ser. No. 449,893
4 Claims. (Cl. 294—77)

Our invention relates to a webbing cargo net and more particularly to a webbing cargo net of improved construction which is stronger than nets of the prior art and which has an extremely long life.

Cargo nets have long been in use as a means for transferring cargo, equipment, and the like from ship to shore, from ship to ship, and for other like uses. Such nets are also used to hold down cargo to the deck of an aircraft or the like to prevent shifting. These cargo nets of the prior art are generally formed of a plurality of net mesh members secured to a peripheral member. Means by which the net may be suspended, such as suspension rings or the like, are fixed at points around the periphery of the net. When the net is in use to transfer cargo, a hoisting hook or the like is passed through all the suspension rings to lift the net and the cargo enclosed thereby. When in use to hold down cargo in an aircraft or the like, the net is laid over the cargo and pinned to the deck by the suspension rings or by local ties over individual mesh members. The arrangement of the individual net mesh members and the disposition of the suspension rings around the peripheral member in the prior art are such that a localized force applied to an individual net mesh member is not distributed among the other net mesh members but is merely translated to a pair of suspension rings disposed at opposite points around the periphery of the net. Consequently, such a localized load tends to overstress the individual net mesh member to which it is applied and tends to tear the individual net mesh member away from the body of the net. Where local ties over individual net mesh members are made, as when securing cargo to the deck of a craft, the danger that the mesh member which is tied down may be torn from the body of the net is increased.

The individual net mesh members of these nets of the prior art are usually formed of rope knotted to the other net mesh members which they intersect at the points of intersection. It will be appreciated that this knotted construction reduces the strength of the rope at the points of intersection. In addition, such a net is difficult to repair.

In use a cargo net must handle objects having sharp edges such as crated material and the like. Moreover, when cargo disposed within the nets is being lifted, the net is very often dragged along a ship deck or along a wharf whereby the individual net mesh members are severely abraded, weakened and shortened in life.

We have invented a cargo net of improved construction which eliminates the disadvantages of the nets of the prior art. The individual net mesh members of our improved net and the suspension rings of our net are so disposed and arranged that a localized load applied to an individual net mesh member will be distributed among several net mesh members rather than being translated to a pair of diametrically opposite suspension rings. It will be appreciated that this construction enables our net mesh members to handle a greater localized load without the danger of being broken or torn away from the net body.

The individual net mesh members of our improved cargo net are formed from flat webbing. This webbing provides net mesh members which are less likely to be severed by sharp corners of a load. This construction also provides a greater bearing surface area for bulky and soft loads. Preferably, we form our net from an improved webbing which is light and flexible, which has a greater tensile strength per cross-sectional area than rope, and which is highly resistant to abrasion. Rather than knotting the individual net mesh members at their points of intersection, we stitch the mesh members to one another. It will be appreciated that this construction provides a net which is easily assembled and rigged. We have, moreover, provided a means for joining net mesh members at their points of intersection which reduces abrasion of the threads securing the members and which prevents a relative shifting of the members when the stitching threads eventually break.

Rather than laying the individual net mesh members on top of one another at the points of intersection and sewing them together, we form the members with passages spaced along their length and interlace intersecting mesh members at the points of intersection. We then stitch the members together. When the net is used to hold down cargo, a local tiedown may then be made over any convenient mesh member without danger of tearing the member away from the net. That is, this interlaced construction ensures that the force applied to an individual net mesh member when a local tiedown is used is translated to a number of other mesh members. A similar construction may also be employed to hold the individual net mesh members to the peripheral member. We have also invented improved stitching for securing net mesh members to one another at points of intersection.

We have provided alternate forms of our net which are adapted to handle fragile cargo without crushing it. Other forms of our net are adapted to handle large quantities of cargo without the danger of a part of the cargo falling out through the slack portions in the net periphery.

One object of our invention is to provide a cargo net of improved construction which is stronger than nets of the prior art and which has an extremely long life.

Another object of our invention is to provide a cargo net of improved construction in which the individual net mesh members are so disposed that a localized load applied to one member is distributed among a plurality of members.

A further object of our invention is to provide a cargo net of improved construction in which the individual net mesh members are formed of webbing.

Still another object of our invention is to provide a cargo net of improved construction which is highly resistant to abrasion.

A still further object of our invention is to provide a cargo net of improved construction which provides a large bearing area for a soft load.

Another object of our invention is to provide a cargo net of improved construction for handling fragile cargo without crushing the same.

Other and further objects of our invention will appear from the following description.

In general, our invention contemplates the provision of a cargo net including a peripheral member which carries a plurality of individual net mesh members. Each net mesh member is joined with the mesh members it intersects at the points of intersection to form the net. In order to provide a means by which the net and the load carried thereby may be suspended, we fix a plurality of suspension rings at predetermined points around the net periphery. The arrangement of our net mesh members and the disposition of the suspension rings is such that a localized load applied to one of the rings will not be transmitted directly to a diametrically opposite ring through an individual net mesh member but will be distributed among a plurality of mesh members. That is, a localized load applied to an individual net mesh member is distributed among a plurality of mesh members rather than being absorbed by the single individual net mesh member. This arrangement is carried through irrespective of the configuration of the net. For example, our net may be square and provided with suspension rings disposed at the corners of the peripheral member. When the net is supported from a hoisting device or the like, a localized load applied to an individual net mesh member will not merely be transmitted by this member to a pair of diagonally opposite suspension rings but will be shared by a plurality of individual mesh members.

We provide our net with an improved construction for joining intersecting mesh members at their points of intersection. To this end each mesh member is formed with transverse slots or passages spaced therealong. At each point of intersection one of the intersecting mesh members is passed through the slot of the other intersecting member. The construction is such that an individual net mesh member alternately passes through a slot of another member and then has another member passed through one of its slots at successive points of intersection along its length. This construction relieves some of the tension on the stitching threads which may be employed to secure the members at points of intersection and aids in preventing shifting of the members relative to one another if the threads break. It ensures that the load resulting from a single tie on an individual mesh member will be shared by a number of mesh members.

We form our mesh members from a flat webbing rather than of rope or the like, as has been the practice in the prior art. While any webbing having sufficient structural strength may be employed, preferably we use an improved webbing which is light, flexible, extremely strong, and highly resistant to abrasion. We form this webbing from yarns made up of continuous synthetic filament threads having a predetermined number of convolutions per unit length, as will be described in detail hereinafter.

In the accompanying drawings which form part of the instant specification and which are to be read in conjunction therewith and in which like reference numerals are used to indicate like parts in the various views:

FIGURE 3 is a fragmentary perspective view drawn on an enlarged scale of the improved webbing cargo net illustrated in FIGURE 1 and showing one means of attaching a corner suspension ring to the net.

FIGURE 4 is a plan view showing another embodiment of our improved webbing cargo net.

FIGURE 5 is a fragmentary perspective view drawn on an enlarged scale of the form of our improved webbing cargo net shown in FIGURE 4.

FIGURE 6 is a fragmentary perspective view drawn on an enlarged scale of the webbing cargo net shown in FIGURE 4 illustrating one means of securing a suspension ring to the net.

FIGURE 7 is a fragmentary perspective view drawn on an enlarged scale of the improved webbing cargo net shown in FIGURE 4 illustrating a second means of securing a suspension ring to the net.

FIGURE 8 is a plan view of still another form of our improved webbing cargo net.

FIGURE 9 is a fragmentary perspective view drawn on an enlarged scale of the net shown in FIGURE 8 illustrating the means of securing a suspension ring to the net.

FIGURE 10 is a plan view with a part broken away of a further embodiment of our improved webbing cargo net.

FIGURE 11 is a plan view of yet another form of our improved webbing cargo net.

FIGURE 12 is a fragmentary perspective view drawn on an enlarged scale of the net mesh members of our improved webbing cargo net showing one form of interlacing means.

FIGURE 13 is a fragmentary perspective view drawn on an enlarged scale of one of the net mesh members of our improved webbing cargo net showing another form of interlacing means.

FIGURE 14 is a plan view of a still further form of our improved webbing cargo net.

FIGURE 15 is a fragmentary perspective view drawn on an enlarged scale of the form of our improved webbing cargo net shown in FIGURE 14.

FIGURE 16 is a fragmentary perspective view drawn on an enlarged scale of the form of our improved webbing cargo net shown in FIGURE 14.

FIGURE 17 is a fragmentary perspective view drawn on an enlarged scale of our improved webbing cargo net showing one manner in which a length of webbing formed of a number of individual net mesh members may be terminated.

FIGURE 18 is a perspective view with parts broken away of yet another form of our improved webbing cargo net which is particularly adapted for handling cargo without crushing or spilling, and FIGURE 18a is a schematic top plan view on a smaller scale of the cargo net of FIGURE 18 with corner members in horizontally extended position.

FIGURE 19 is a fragmentary perspective view drawn on an enlarged scale of the sling ring employed in the form of our improved webbing cargo net shown in FIGURE 18.

FIGURE 20 is a fragmentary perspective view drawn on an enlarged scale of the form of our improved webbing cargo net shown in FIGURE 18 showing the manner in which lengths of webbing are carried by the peripheral members.

FIGURE 21 is a plan view of a still further form of our improved webbing cargo net.

FIGURE 22 is a fragmentary perspective view, drawn on an enlarged scale, of the form of our webbing cargo net shown in FIGURE 21.

Figure 1:
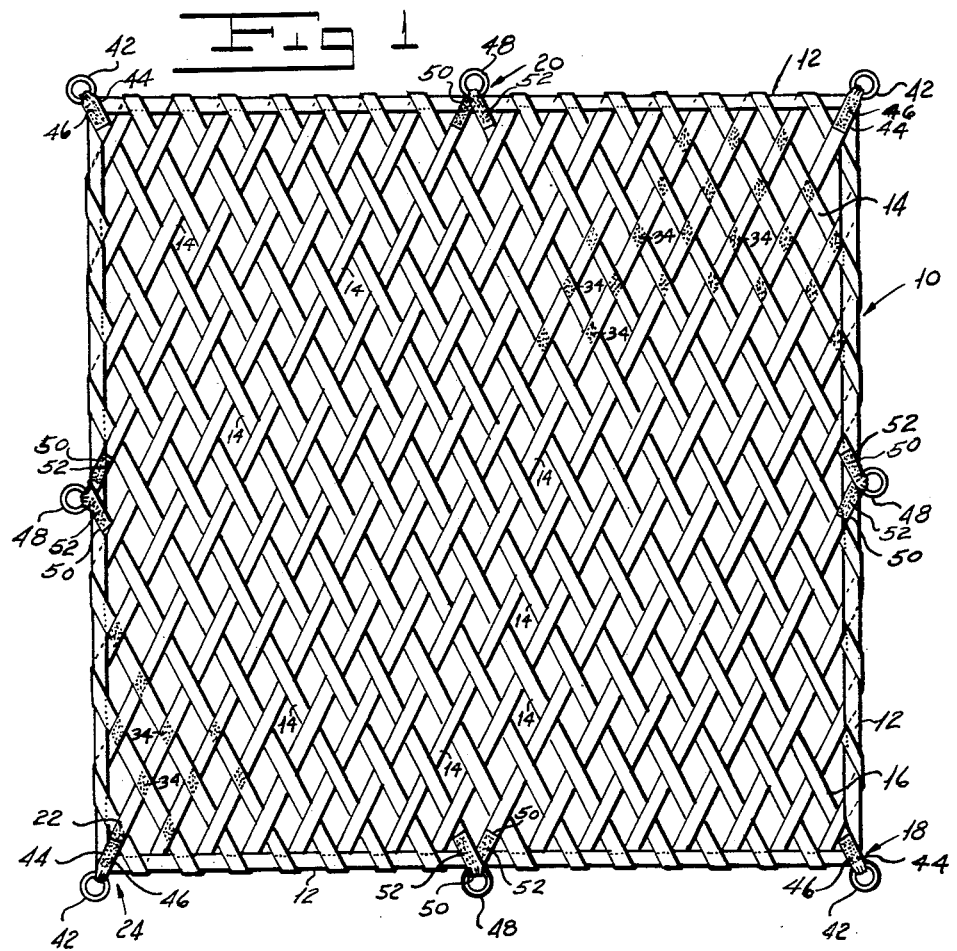
FIGURE 1 is a plan view of our improved webbing cargo net.

More particularly referring now to the drawings, FIGURE 1 shows our improved webbing cargo net, indicated generally by the reference character 10, in the form of a square. The net 10 includes a peripheral member 12 which carries a plurality of individual net mesh members 14. While the net mesh members 14 may be formed of any material such as rope or the like, preferably we employ a webbing as will be described in detail hereinafter. The arrangement of the individual net mesh members 14 is such that no member extends diagonally from one corner of the net to another. A net mesh member extending from one corner of the net passes across the net to a point intermediate the corners on the opposite side. For example, a net mesh member 16 running from a corner, indicated generally by the reference character 18, extends across the net to a point, indicated generally by the reference character 20, intermediate the corners on the opposite side of the net. Similarly, a mesh member 22 running from a corner, indicated generally by the reference character 24, extends across the net to point 20. It will readily be appreciated that the mesh members 16 and 22 may be formed as a continuous length of webbing or the like.

Figure 2:
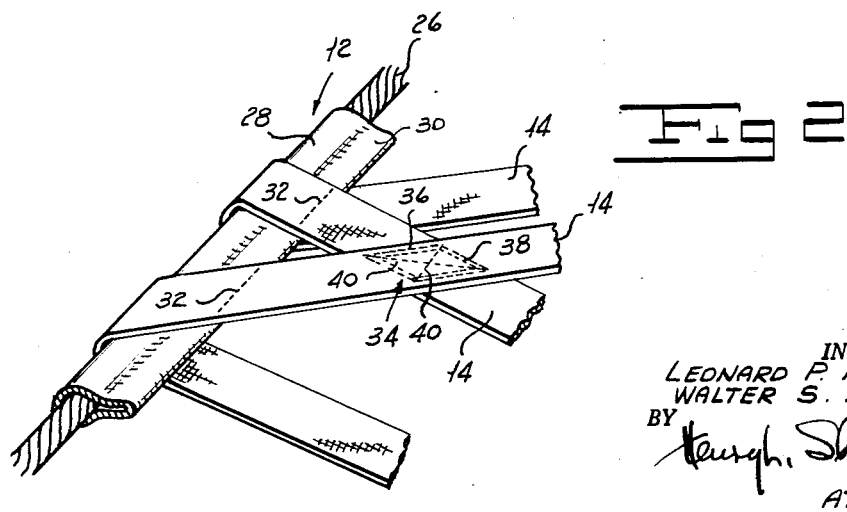
FIGURE 2 is a fragmentary perspective view drawn on an enlarged scale of the improved webbing cargo net illustrated in FIGURE 1.

Referring now to FIGURE 2, the peripheral member 12 includes a rope 26 which may be formed of manila hemp, steel wire cable, or any other suitable material. The cable 26 is enclosed in a tubular peripheral shoe 28 formed with a lip 30 by any convenient means such as stitching or the like. A continuous length of material forming a number of individual net mesh members 14 passes around the peripheral member 12 and may be secured to the lip 30 of the tubular shoe 28 by stitching 32. It will be apparent from the figures that a pair of mesh members 14 formed by a continuous length of material are angularly disposed relative to one another so that each member 14 intersects certain of the other members. A pair of intersecting members 14 are joined at their point of intersection by stitching, indicated generally by the reference character 34. While any means may be employed to join intersecting net mesh members one to the other at the point of intersection, since we prefer to use webbing for the net mesh members, conveniently we stitch the members to one another at the point of intersection. This stitching is in the form of a parallelogram, two sides 36 of which are parallel to the edges of one of the members 14 and the other two sides 38 of which are parallel to the sides of the other intersecting member 14. The stitching on each of the sides 36 and 38 may conveniently be a double line of stitches. A pair of diagonals 40 complete the stitching 34, as can readily be seen by reference to FIGURE 2. We have discovered that this configuration of stitching 34 most effectively resists the tendency of a pair of intersecting members 14 to shift relative to one another.

Referring now to FIGURES 1 and 3, we dispose a plurality of corner sling or suspension rings 42 at the corners of the net. Each of the rings 42 may conveniently be secured to the peripheral member 12 and one of the members 14 by a length of reinforcing webbing 44 fixed to the member 12 and the mesh member 14 by stitching 46. The length of webbing 44 forms a loop through which the associated ring 42 passes. The rings 42 provide a means by which the net 10 may be suspended from a hoisting device or by which the net may be secured to the deck of an aircraft or ship when employed to hold down cargo. It will readily be appreciated that when the net is in use a force applied to the ring 42 at the corner 24 will not be directly transmitted by the mesh member 22 to the ring 42 diametrically opposite the corner 24 but will be shared by other mesh members of the net. The force exerted on the ring 42 in corner 24 will be resisted by the rings 42 attached to that side of the net which includes the point 20 at which the member 22 is secured. Some of the force will, consequently, be borne by the mesh member 16 secured between the point 20 and the ring 42 at corner 18. It will be appreciated that irrespective of the individual net mesh member to which a force is applied, the force will be distributed among a plurality of mesh members 14 rather than being absorbed only by the member to which it is applied. The individual rings 42 of a pair of rings are secured to the peripheral member 12 at respective points other than the points at which an individual net mesh member engages the peripheral member.

While only the corner sling or suspension rings are essential, it may be desirable to employ additional auxiliary sling rings 48 at spaced locations around the peripheral member 12 intermediate the corners. Each of the rings 48 may conveniently be secured to the peripheral member 12 and to the net mesh members 14 by a length of reinforcing tape 50 secured to the member 12 and to a pair of mesh members 14 by stitching 52. The reinforcing tape 50 may be secured at one end by stitching to a first one of a pair of diverging mesh members 14 and at the other end to the other mesh member 14 of the pair to form a loop in which the ring 48 is carried. The stitching 52 employed to secure the reinforcing tape 50 to the members 14 also serves to secure the ends of the tape 50 to the member 12. If desired, a pair of crossing reinforcing tapes 50 rather than a single length of tape may be employed to provide a retainer for a ring 48. Further, rings 48 may encompass peripheral member 12 at the point of intersection of a pair of diverging members 14, if desired.

Referring now to FIGURE 4, we have shown a form of our invention which provides a greater cargo-carrying capacity for the surface area of the net than does the square net shown in FIGURE 1. We accomplish this by forming the net as a rhomboidal polygon having, for example, six sides as shown. A peripheral member, indicated generally by the reference character 54, forms the respective sides 56, 58, 60, 62, 64, and 66 of the polygon. In the form shown, each of the sides 56, 58, 62, and 64 is equal in length to the other, and the sides 60 and 66 are equal to each other and of a length somewhat less than the remaining sides. A plurality of interlaced net mesh members 68 secured to the peripheral member 54 complete the net construction. Each of the mesh members 68 is secured to the other mesh members which it intersects at the points of intersection by stitching or the like 70. Certain pairs of the mesh members 68 may be formed of a continuous length of material. For example, a mesh member 72 beginning at side 56 runs across the net to side 60 where it is looped around the peripheral member 54 and extended to the side 64. Others of the mesh members 68 merely extend between opposite sides. For example, a mesh member 74 beginning at side 56 extends across the net and terminates at the side 62. The arrangement is such, however, that a load applied to one of the mesh members 68 will be distributed among others of the mesh members 68.

The construction of the peripheral member 54 and the manner in which certain of the mesh members 68 are secured thereto is illustrated in FIGURE 5. The peripheral member 54 includes a pair of webbings 76 and 78 having a gusset webbing member 80 sandwiched therebetween. These webbings 76, 78 and 80 are secured to one another by stitching 82 running the length of the member 54. Gusset 80 has a width which is substantially twice the width of each of the webbings 76 and 78 and extends inwardly from the webbings 76 and 78 approximately half the distance of its width. In FIGURE 5 we have shown by way of example the side 60 of the peripheral member 54 around which a continuous length of webbing is looped to form a pair of angularly disposed mesh members 68. Each of the mesh members 68 is secured to the peripheral member 54 by stitching, indicated generally by the reference character 84, passing through all the webbings 76, 78 and 80 and extending over the inwardly extending portion of the gusset 80. This stitching 84 is formed as a parallelogram including a pair of sides 86 parallel to the edges of the webbing 68 and a pair of legs 88 running parallel to the peripheral member 54. A pair of diagonal rows of stitching 90 completes the stitching 84.

In order to provide a means by which the net may be suspended or secured to the deck of an aircraft or other vessel, we provide sling rings secured at spaced points around the periphery of the net. Each of a first pair of sling rings 92 is fixed, respectively, at the junction of sides 56 and 58 or at the junction of sides 62 and 64. Referring now to FIGURE 7 each sling ring 92 encircles the peripheral member 54 including the webbings 76, 78 and 80. If desired, a reinforcing tape 94 fixed to the member 54 by stitching 96 may be employed.

Each of a second pair of sling rings 98 is disposed respectively adjacent the mid-point of one of the sides 60 or 66. As can be seen by reference to FIGURE 6, each sling ring 98 surrounds the peripheral member 54 including webbings 76, 78 and 80 and also surrounds the continuous length of material forming a pair of angularly disposed mesh members 68. If desired, a length of reinforcing tape 100 secured to the respective angularly disposed mesh members 68 by stitching 102 may be employed.

It is to be noted that while we have shown one means by which sling rings are attached to the construction shown in FIGURE 1 and a second means by which the sling rings are secured to the net in FIGURE 4, either method may be employed in practice as desired. A reefing line (not shown) may be passed through the suspension rings of the form of our invention shown in FIGURES 1 and 4 to provide the nets with narrow necks when in use.

The arrangement of the mesh members 68 and the disposition of the sling rings 92 and 98 of the net of FIGURE 4 are such that a force exerted on one of the rings will not be transmitted directly to an opposite ring through a single mesh member. Rather the force is distributed among a plurality of mesh members 68. For example, if a force were applied to the ring 98 on side 60 when the net was in use, the force would be shared between the mesh member 68 running to side 56 and the mesh member running to side 64. Similarly, if the net were secured at two diametrically opposed points on its periphery, a force directed on a line connecting the two points would not be absorbed by a single mesh member but would be distributed among a plurality of the members.

In FIGURES 8 and 9 we have shown a form of our improved webbing cargo net which is adapted to form a generally spherical cargo-carrying enclosure from a net woven as a flat circular area. This net, indicated generally by the reference character 104, includes a tubular shoe 106 forming the peripheral boundary member of the net 104. The body of the net is made up of a plurality of interlaced net mesh members 108 secured to the peripheral member 106. It will be appreciated that a number of individual net mesh members may be formed from a continuous length of material. For example, a member 110 looped about the peripheral member 106 and secured along its own length by stitching 112 passes across the net and around member 106 at a point 116, and thence passes again across the net to a point where its end is passed around member 106 and secured along its own length by stitching 118.

In order to provide a means by which the periphery of the net 104 may be drawn up to decrease the diameter of the net and form a generally spherical enclosure for cargo, we thread a draw rope or cable 120, which may be formed from fibrous material or steel wires, through the tubular shoe 106. At predetermined points around the periphery of the net 104 we form loops 122 in the draw cable 120. In order to form the loop, the cable is passed through a first lead eye 124, the loop is formed and the end then passed through a second lead eye 128. Eyes 124 and 128 are maintained in spaced relationship by a strut 130 formed integrally therewith. A sling ring 132, by means of which the net is to be suspended, passes through the loop 122. An adapter 133 surrounds the loop legs to permit the cable 120 to be drawn from within the shoe 106 with a maximum of ease. A bar 134 extending diametrically across the adapter 133 between the loop legs provides a bearing surface on which the loop legs may slide when tension is placed on the loop. It will be appreciated that the strut 130 provides a means by which tension may be applied to a length of material passing therethrough and forming a pair of net mesh members.

The relative disposition of the net mesh members and the positioning of the sling rings 132 around the periphery of the net 104 is such that a load applied to one of the net mesh members will be distributed among a plurality of other net mesh members. The net mesh members 108 are interlaced in a manner similar to that described in connection with FIGURES 1 and 4 and are secured to each other at the points of intersection by stitching 136 similar to the stitching 34 and 70. When the net 104 and the load encompassed thereby are to be raised, sling rings 132 are connected to a suitable hoisting device. As the load is lifted, the cable 120 is drawn out through the adapters 133 to form loops 122 to decrease the diameter of the net without applying a localized strain to any of the net mesh members. It will readily be appreciated that the force exerted on the net mesh members 108 formed by the length of material passing around the strut 130 will be distributed among a plurality of net mesh members.

We have provided a modified form of our invention for use when it is desired to transfer fragile cargo or freight without the danger of crushing the same. Referring now to FIGURE 10, the net 104 shown therein is of a construction similar to that illustrated in FIGURE 8. This net, however, is provided with a pair of telescoping hoops 137 and 138. The net 104 is first laid over the hoop 138 and the hoop 137 is pressed therein so as to engage a portion of the net between the hoops. The action of hoops 137 and 138 is similar to that of a pair of embroidering hoops. When the draw cable 120 is drawn up, a cylindrical net is formed wherein the portions of the net 104 outside the area enclosed by the hoops 137 and 138 forms the walls of the cylinder as indicated in broken lines in FIGURE 10. It is to be understood, of course, that the diameters of the hoops 137 and 138 are considerably less than the diameter of the net 104. Conveniently, this net may be equipped with a base board inserted within the ring 137 and the sling rings may be attached to cross bar yokes equal to the diameter of the hoop 137. Fragile freight may readily be transferred therein without the danger of crushing. Alternately the portion of the net sandwiched between hoops 137 and 138 is woven between the hoops to provide a shallow cylindrical base for the net, and the need for the hoops is substantially eliminated.

A further form of generally cylindrical net is illustrated in FIGURE 11. In this form of cylindrical net a portion of the net, indicated generally by reference character 140, is gathered in by a retaining grommet 142 which is formed of wire cable and is intermeshed with the net mesh members 108 to form a deep baglike base. Preferably this baglike portion 140 is woven over a cylindrical form of the proper depth to eliminate the puckering of net elements over the side wall of the baglike base. With the exception noted, the construction of the net illustrated in FIGURE 11 is similar to that shown in FIGURE 8.

While we have shown the net mesh elements of our net as being secured to one another at intersecting points merely by stitching such as stitching 34, 70 and 136, preferably we employ improved means for joining mesh net members at their points of intersection. This improved means is illustrated in detail in FIGURES 9, 12 and 13. Referring now to FIGURE 12, a net mesh member such, for example, as a member 14, is formed of a woven webbing. This webbing is woven to form transversely extending tunnels 144 at spaced points along the length of the member 14. The tunnels or passages 144 conveniently are formed by weaving each half of the warp threads as a unit for the distance of the passage 144 in the direction of the length and then weaving all the warps as a unit. This angle should be equal to the angle of intersection of a pair of intersecting net mesh members. The method of interlacing the net mesh members is shown in FIGURE 9. A particular net mesh member such as a member 108 alternately passes through the slot 144 of an intersecting net mesh member and then has an intersecting net mesh member passed through one of its slots 144 at successive points of intersection along its length. The intersecting net mesh members are then secured to each other by stitching such as the stitching 34, 70 and 136.

FIGURE 13 shows an alternate method of forming the slots 144. A pair of webbings 146 and 148 are stitched together along their lengths by stitching 150 to form a net mesh member 14. At the points at which it is desired to form the slots 144, the stitching 150 is discontinued over the length of the slot. While the slots shown in FIGURES 12 and 13 are disposed at right angles to the length of the member 14, it may conveniently be formed at any desired angle. When disposed at right angles to the length of webbing, slots 144 are of sufficient length to permit the mesh member passing therethrough to lie naturally without distortion or bunching. It will be appreciated that this construction reduces the strain on the threads making up the stitching at a point of intersection and further provides a means for preventing a relative shift of intersecting net mesh members with respect to one another in the event the threads break. This construction ensures that a load applied to an individual net mesh member by a local tie passing over the member will be translated to a plurality of mesh members. Consequently, the danger of such a member being torn away from the net is reduced.

We have provided the intersections of the net mesh members with means for protecting the stitching from abrasion. In order to accomplish this we wrap a length of tape 153 around the intersection and secure the ends of the tape together by stitching 154 located at a point of intersection of the net mesh members where it will not be subject to abrasion, as can readily be seen by reference to FIGURE 9. This construction provides an intersection connection which is highly resistant to abrasion so that the danger of the threads making up the stitching being broken is reduced. If desired, the stitching 136 securing intersecting mesh members to one another could be replaced by any other convenient means, such as a metal rivet 135.

While our improved net construction may be employed on a net made up of net mesh members formed of any material, preferably we employ a flat webbing. This webbing is not likely to be broken by sharp cornered objects such as crates and the like and more readily resists abrasion than does rope. While any type webbing having sufficient structural strength may be employed to form the net mesh members, preferably we employ a webbing formed from yarns made up of synthetic continuous filament threads having a predetermined number of convolutions per unit length. When synthetic filaments such as nylon or the like are formed into threads they are customarily twisted to only a slight degree such as is necessary to hold the filaments together as a unit. We have discovered that the abrasion resisting qualities of yarns formed from such threads can be substantially improved by further spinning the threads to a predetermined number of convolutions per inch. In order to form our webbing, we first take a group of continuous filaments and spin them together to a degree where the residual elongation of the individual filaments is reduced, so that yarns formed from the threads present a hard surface when woven into a fabric. A number of yarns formed from these threads are woven together to form a webbing which has a high degree of resistance to abrasion. We have discovered that approximately eighteen to twenty convolutions per inch for threads formed from nylon filaments produces satisfactory results. It is to be noted that our webbing retains its flexibility. Some webbings of the prior art formed of normally spun nylon filament threads have been impregnated with resinous material in an attempt to improve their abrasion resisting qualities. This impregnation has, however, made the webbings formed from the yarns markedly stiff and inflexible. Our webbing eliminates this disadvantage.

Referring now to FIGURES 14 to 16, we have shown yet another form of our improved webbing cargo net. In this form of our invention the individual net mesh members are symmetrically disposed with respect to the geometrical center of the net in a manner such that a load applied to an individual net mesh member will be distributed among a plurality of mesh members. This form of our invention is also provided with an improved means for joining the individual net mesh members with the peripheral member.

The form of our invention illustrated in FIGURES 14 to 16 includes a peripheral member indicated generally by the reference character 150. A number of individual net mesh members 152, groups of which may be formed from a single length of webbing, complete the net structure. At the corners of the net 150 we attach rings 154 by means of which the net may be suspended when carrying a load or by means of which the net may be secured to the deck of an aircraft or other vessel when placed over cargo. In FIGURE 14 we have shown a first center line 156 which bisects sides 158 and 160 of the net. A second center line 162 bisects net sides 164 and 166 to locate the geometrical center of the net at the point of intersection of lines 156 and 162. This point is indicated generally by the reference character 168. As will be apparent from an examination of FIGURE 14, net mesh members 152 are symmetrically disposed with respect to the geometrical center 168 of the net. The relative angular disposition of the net mesh members 152 is such that no mesh member 152 passes from one corner ring 154 directly to a diametrically opposite ring 154. As a consequence of this construction, a highly localized load applied to an individual net mesh member will be transferred from the net mesh member to which it is applied to a number of other net mesh members. Net mesh members 152 are formed of flat webbing which is woven from synthetic, continuous filament yarns formed of threads having a predetermined number of convolutions per unit length. It will be appreciated that a number of individual net mesh members 152 may be formed from a single length of webbing. The individual net mesh members 152 are interlaced with each other at the points at which they intersect in the same manner as was explained in detail in connection with FIGURES 12 and 13.

The form of our improved webbing cargo net shown in FIGURE 14 is provided with improved means for joining the individual net mesh members 152 with the peripheral member 150. Referring now to FIGURE 15, along the sides 158 and 160 of the net the peripheral member 150 is formed by a pair of lengths of webbing 170 and 172. Each of the lengths of webbing 170 and 172 is formed with a plurality of passages 174 spaced along the length thereof. In order to join the individual net mesh members 152 with the peripheral member 150 along sides 158 and 160, we first pass the length through one of the slots or passages 174 formed in the length of webbing 172. After the length of webbing has been passed from inside the net through webbing 172 to the outer periphery of the member 150, it is doubled back over the upper webbing laminate 170 and then back under the lower laminate 172. After the length of webbing forming a number of net mesh members 152 has thus been passed under the lower webbing laminate 172, it is doubled back and passed through one of the channels 174 formed in the upper webbing laminate 170. It will readily be appreciated that this construction forms an extremely strong joint between the individual mesh members 152 and the peripheral member 150 along sides 158 and 160. The passages or channels 174 in the laminates 170 and 172 may be formed by weaving these laminates in the same manner as the webbing shown in FIGURE 12. Alternatively, they themselves may be laminated to form passages 174 in a manner similar to that in which the passages 144 were formed in the webbing shown in FIGURE 13. It will readily be understood that the angular disposition of passages 174 with respect to the longitudinal axes of the webbing, as well as the spacing of the passages along the webbing, will be determined by the dimensions chosen for the net. Laminates 170 and 172 may conveniently be joined by stitching 176 adjacent the edges thereof. It is to be understood that the relative spacing and disposition of the passages 174 in laminate 170 with respect to the passages 174 in laminate 172 must be determined before the laminates are joined by stitching 176.

We form the lateral side members 164 and 166 of peripheral member 150 with a discontinuous filler 178 between the webbing laminates 170 and 172. The right-hand side member 166 is shown on an enlarged scale in FIGURE 16 to which reference is now had. This filler 178 is so cut as to form spaced passages 180 along each of the sides 164 and 166 of the peripheral member 150. In order to join the individual mesh members 152 with sides 164 and 166, we pass a length of webbing forming members 152 first between laminates 170 and 172 through a passage 180 formed by the filler 178. The length of webbing is then passed back over the laminate 170 to the next succeeding net mesh member. It will be appreciated that this construction forms an extremely strong junction between the individual net mesh members and the sides 164 and 166.

We have also provided the form of our invention shown in FIGURE 14 with improved means for joining the corner sling rings 154 to the net. As can be seen by reference to FIGURE 16, the laminates 170 and 172 are each passed through a ring 154 at a corner. The length of webbing forming the lower laminate 172 is first passed through the ring. A length of webbing 152 passing through a passage 174 toward the outer periphery of the net is then passed under the lower laminate 172, back over laminate 172 and then run through the ring over that part of laminate 172 which passes through ring 154. The length of webbing forming the upper laminate 170 in side 158 is then passed down over the webbing 152 and up under laminate 172 and through ring 154 to side 166. It can be seen that the length of webbing forming the upper laminate 170 in side 158 also forms an upper laminate in side 166. The lower laminate 172 in side 158 also forms the lower laminate 172 in side 166. The length of webbing which forms a number of net mesh members lies between the portions of laminates 170 and 172 extending through ring 154. After its passage through ring 154 this length is passed over laminate 170. It is then run through a channel 180 formed between laminates 170 and 172 on side 166 by the filler 178. The remainder of the net structure is then completed as before. This manner of securing the sling rings 154 to the net results in an extremely rugged construction. No stitching is employed which might be broken by the shock occasioned when the net carrying a load is suddenly arrested. The tapes 170 and 172 may conveniently be held together as a unit with the filler 178 in sides 164 and 166 by stitching 182 along the lengths of sides 164 and 166 adjacent the edges thereof.

Referring now to FIGURE 17, one manner in which a length of webbing forming a number of individual net mesh members may be terminated is illustrated therein. The net may be of the type shown, for example, in FIGURE 14 and includes a side, indicated generally by the reference character 184. Side 184 includes a pair of webbing laminates 186 and 188 stitched together by stitching 190 adjacent each edge thereof to form the side 184. Laminates 186 and 188 may be formed with channels or passages such as the passages 174 shown in FIGURE 15. Alternately, however, as shown in FIGURE 17, the side 184 is provided with passages 192 formed between laminates 186 and 188. Passages 192 may be formed by stitching and the individual net mesh members may be run between laminates 186 and 188 and secured to the peripheral member or side 184 by stitching 190. A single length of webbing may be used to form a number of individual net mesh members 194. To form a complete net as few as nine individual lengths of webbing may be employed. It will readily be appreciated that these lengths of webbing must be terminated at some point over the surface of the net. A length of webbing 196 which forms a number of net mesh members may be passed through a passage 192 and then looped around side 184 and passed back through another passage 192. The end 198 of such a length 196 is then terminated at the point of junction of a pair of intersecting net mesh members 194. As can be seen by reference to FIGURE 17, the end 198 is passed into the channel 144 of the net mesh member 194 which it intersects. It is secured in this position by stitching including sides 200 and diagonals 202. It will be understood also that the length 196 is to have a second length of webbing secured thereto to provide a continuous net configuration. This length of webbing 204 passes through the channel 144 in which the end 198 is secured and follows the path of the length 196 back through a passage 192 in side 184 around the side and through a second passage 192 back toward the inside of the net in the direction of length 196. The end 206 of the length 204 is terminated in the last passage 144 through which length 196 passed before entering a side channel 192. Stitching including sides 200 and 202 may secure the end 206 in place within this channel. It will be appreciated that the foregoing construction provides an extremely secure means for terminating lengths of webbing to form a continuous net mesh structure.

FIGURES 18 to 20 illustrate yet another form of our improved webbing cargo net which includes a boxlike base having a bottom, indicated generally by the reference character 208, and sides, indicated generally by the reference characters 210, 212, 214, and 216, respectively. The bottom 208 is formed of a number of individual net mesh members 218 which are formed of continuous lengths of webbing. Each of the individual net mesh members 218 is secured to a bottom peripheral member, indicated generally by the reference character 220, and passes upwardly to form one of the individual mesh members 222 of a side 210, 212, 214, or 216. Members 222 are, in turn, secured to a side peripheral member, indicated generally by reference character 224. In order to provide a means by which the box-like base formed by bottom 208 and sides 210, 212, 214, and 216 may be suspended, we weave four pyramidal-shaped portions, each of which is indicated generally by reference character 226, from continuations of the members 222. The continuations of the members 222 form the individual net mesh members 228 of each of the sections 226. It is to be understood that the mesh structure formed by the individual net mesh members 218, 222, and 228 is such that the load reaction is equally distributed over the perimeter 224 of the boxlike base. Each of the pyramidal members 226, it will be noted, extends around one of the corners of the boxlike base. This angular closure deployment prevents sagging of the peripheral walls of the base at the center of the sides. These mesh members may be interlaced one with the other in the manner shown in detail in FIGURE 9. The bottom 208 of this form of our invention may receive a rigid board or plate to provide a solid base and lend rigidity to the construction. In order to provide a means by which this net may be suspended we secure a sling ring 230 at the top of each of the respective pyramidal continuations 226. As can be seen by reference to FIGURE 19, the ring 230 is provided with a cross bar 232 to which certain of the net mesh members 228 of each pyramidal portion may be secured. The net mesh members 228, which are secured to the base of ring 230 and to cross bar 232, are looped over either the base or the bar and secured back along the lengths by any suitable means such as stitching 234. Bar 232 provides additional bearing surface for the mesh members 228 secured to the ring 230. It will be appreciated that if all of the mesh members which were to be secured to the ring 230 were attached to the base thereof, excessive friction between the members would result.

Referring now to FIGURE 20, the side peripheral member 224 includes a pair of laminated webbings 236 and 238 which may be secured to each other by stitching 240 if desired. In order to secure the length of webbing forming the mesh member 222 to the peripheral member 224 as it passes upwardly to form a member 228 of the perimeter portion 226, we first pass the length between webbings 236 and 238, then pass the length out around webbing 236, under both webbings 236 and 238, up in back of webbing 238 over both webbings 236 and 238, then downwardly and up through the space between webbings 238 and 240. This construction provides a secure engagement between the lengths of webbing and the side peripheral member 224. The bottom peripheral member 220 may similarly be laminated and the lengths of webbing forming the base mesh members 218 may be interlaced therewith in the manner shown in FIGURE 20 to form the members 222. The form of our invention shown in FIGURES 18 to 20 is especially adapted for use in transferring fragile or bulk cargo without danger of spilling.

Referring now to FIGURE 21 we have shown a still further form of our improved webbing cargo net which is particularly adapted for aircraft service where booms and cables are employed for hoisting or lowering personnel or cargo from aerial positions. This net assumes a pouch configuration when stressed under load. It may also serve as a tie-down net for cargo when a multiplicity of points of anchorage for the tie-down net are desirable. This form of our invention employs no metallic elements and thus is lightweight and occupies very little storage space. Sling hooks or other securing means may be directly attached to the net peripheral member. As is the case with the other forms of our invention, the configuration of the individual net mesh members of this form of net, as well as the disposition of the points at which the net may be suspended or secured, are such that a localized load applied to an individual net mesh member is distributed among a plurality of individual net mesh members. Such stitching as may be employed in this form of our invention serves only to retain the net mesh members in the proper positions relative to the other net mesh members and relative to the peripheral member. This stitching is not relied upon to support the load. This form of our invention includes a peripheral member 242 carrying the lengths of webbing which form the individual mesh members of the net. A first length of webbing extends from a point 244 intermediate the corners 246 and 248 of the net to the corner 250 of the net and thence back across the net to a point 252 intermediate corners 254 and 256 of the net. This length of webbing thus forms a first pair of pattern or master mesh members 258 and 260. A second pair of master or pattern mesh members 262 and 264 are formed by a length of webbing extending from a point 266 on the side of the net between corners 246 and 248 to the corner 268 diametrically opposite the corner 250. This length of webbing extends from corner 268 to a point 270 intermediate corners 254 and 256. The remainder of the individual net mesh members 272 of the net are relatively angularly disposed with respect to the master members and are so disposed on the peripheral member 242 that no individual mesh member extends between a pair of corners of the net. It will be appreciated that this form of construction ensures that a localized load applied to any individual net mesh member will be distributed among a plurality of mesh members rather than being absorbed only by the net mesh member to which it is applied. As is the case with the other forms of our invention, we form each of the individual net mesh members 258, 260, 262, 264, and 272 from lengths of webbing formed from yarns made up of continuous synthetic filament threads having a predetermined number of convolutions per unit length.

Referring now to FIGURE 22, it can be seen that the length of webbing forming the master mesh members 262 and 264 is passed over the corner 268 to form members 262 and 264. The peripheral member 242 may also be formed of webbing similar to that employed to form the individual net mesh members. The length of webbing forming peripheral member 242 is given a half turn at each of the corners of the net. A length of filler webbing 274 is enclosed by the half turn and may conveniently be held in place by means such as stitching 276. A suspension hook 278, indicated in phantom in FIGURE 22, may be passed through the apex formed by members 262 and 264 to provide a means by which the net may be supported. Filler 274 provides a bearing area for the hook 278 and prevents abrasion of the peripheral member 242 when the net is loaded.

In order to provide a means for interlacing the individual net mesh members one to the other at the points of intersection, we provide the webbings forming the mesh members with longitudinal slots 280 spaced along the length thereof. Slots 280 may conveniently be formed during the process of weaving the webbing. Each individual net mesh meber alternately has an intersecting mesh member passed through one of its slot 280 and then passes through the slot 280 of another mesh member at successive points of intersection along its length. Slots 280 provide a means for securing individual net mesh members one to the other so that a load applied to one net mesh member will be distributed among a plurality of other net mesh members in a highly efficient manner. Conveniently, stitching 282 may be employed to retain the members in the proper relative angular positions. This stitching 282, however, is not relied upon to absorb any of the load but merely serves to retain the members in their proper relationship.

As can be seen also by reference to FIGURE 22, the lengths of webbing forming the mesh members 272 are held to the peripheral member 242 at points on the sides of the net intermediate the corners by making a turn of the length of webbing about the peripheral member at the desired point of support. These lengths of webbing may, if desired, be held in position on the peripheral member by stitching 284. As was the case with stitching 282, the stitching 284 serves only to retain the lengths of webbing in position along peripheral member 242 and serves no function of supporting any of the load. While we have shown this form of our invention as having a hexagonal configuration, it will readily be appreciated that any polygonal configuration may be employed. When the net is suspended by means of hooks or the like passed through the corners of the net, the net body readily assumes a baglike configuration under the load. It thus provides a convenient means for transferring cargo or personnel from aerial positions without danger of loss.

In use, for the usual hoisting problems encountered, the forms of our invention shown in FIGURES 1 or 4 may be employed. An appropriate hoisting hook or the like is inserted through the respective sling rings 42 or 92 and 98 and the load encompassed by the net is raised. It will be appreciated that during this hoisting operation a localized load applied to one of the net mesh members 14 or 68 will not be translated by such a member to a pair of diametrically opposite sling rings but will be distributed among a plurality of net mesh members. Since we have formed the net mesh members from tape, sharp cornered objects will not damage the net mesh members as was the case with rope nets of the prior art. In the event the net is dragged along the dock or the deck of the ship during a transfer operation, the net mesh members will not be severely damaged, since they are formed of tape which is highly resistant to abrasion. Further, if severe abrasion is to be encountered, the intersections of the net mesh members may be protected with a length of tape 152. If the net is to be employed to hold down cargo in an aircraft, it may be laid over the cargo and secured to the deck by sling rings 42 and 48 or 92 and 98. In addition, it may be secured by local ties over individual net mesh members. The force on a net mesh member resulting from such a local tie will not be absorbed solely by the tied net mesh member. Rather, it will be distributed to a plurality of net mesh members by virtue of the manner in which we interlace the mesh members at the points of intersection.

The form of our invention illustrated in FIGURE 8 provides a baglike net for carrying cargo without the danger of spillage through slack portions of the peripheral member of the net. The cargo is first placed on the net and then a suitable hoisting hook or the like is passed through the sling rings 132 to lift the net. As force is applied to the sling rings 132, the draw cable 120 of the net will be drawn up tight into the loops 122 to provide a narrow neck for the baglike cargo net. This action reduces the net diameter without placing any localized strains on a single net mesh member. As was the case with the nets shown in FIGURES 1 and 4, a localized force applied to any one of the net mesh members 108 is distributed among a plurality of net mesh members.

When it is desired to hoist a fragile cargo, the form of our invention shown in FIGURES 10 or 11 may be employed. The cargo is placed in the base of the net formed by the hoops 137 and 138 or the base formed in the portion of the net enclosed by the member 142. The draw rope of each of these nets may then be pulled in the manner in which the draw rope of the net of FIGURE 8 was hoisted to form a substantially cylindrical net. It will be appreciated that cargo may be transferred in such net without the danger of crushing.

Each of the nets of our invention is preferably provided with the means for interlacing the net mesh members shown in FIGURE 12 or FIGURE 13. Each net mesh member is alternately passed through the slot 144 formed in an intersecting net mesh member and then has an intersecting net mesh member passed through its slot. The net mesh members are then secured one to the other at the points of intersection by such stitching as 34. This construction reduces the strain on the individual threads making up the stitching and provides a means for preventing the relative shift of the intersecting net mesh members in the event the threads break. It ensures that the force resulting from a local tie over an individual net mesh member is transmitted to a plurality of members.

It will be seen that we have accomplished the objects of our invention. We have provided a webbing cargo net in which a localized load or force applied to an individual net mesh member is distributed among a plurality of net mesh members. Our net mesh members are formed of webbing which is not readily severed by sharp cornered objects as are rope nets of the prior art. Moreover, we form the net mesh members of an improved webbing which is highly resistant to abrasion. This webbing construction provides a greater bearing surface area for bulky loads than do the rope nets of the prior art. We have provided various forms of our improved webbing cargo net which are adapted to carry large loads without spillage and which are adapted to carry fragile loads without the danger of crushing. Each of our nets is provided with improved means for interlacing the net mesh members at their points of intersection so that the strain in the threads securing the intersecting mesh members is reduced and the mesh members are restrained from shifting relative to one another when the threads are broken. In addition, our improved intersection construction ensures that the load resulting from a local tie passing over an individual net mesh member is transferred to a plurality of mesh members so that the individual mesh member is not torn away from the net. Moreover, if severe abrasion is to be encountered, we have provided means for protecting the threads securing the intersecting net mesh members.

It will be understood that certain features and subcombinations are of utility and may be employed without reference to other features and subcombinations. This is contemplated by and is within the scope of our claims. It is further obvious that various changes may be made in details within the scope of our claims without departing from the spirit of our invention. It is therefore to be understood that our invention is not to be limited to the specific details shown and described.

Having thus described our invention, what we claim is:

1. A cargo net including in combination a peripheral member, a plurality of intersecting net mesh members carried by said peripheral member and a plurality of suspension rings disposed at spaced points around said peripheral member, said peripheral member being formed with an upper and lower laminate, said lower laminate being passed through each of said suspension rings at the points at which said rings are disposed around said peripheral member, said upper laminate being passed first under said lower laminate and then through said rings at the points at which said suspension rings are disposed around said peripheral member whereby said suspension rings are secured to said peripheral member.

2. A cargo net as in claim 1 wherein said net mesh members are formed from continuous lengths of webbing, said peripheral member being formed with spaced passages therearound through which said lengths of webbing are adapted to pass, a length of webbing being passed through each of the respective suspension rings between said upper and lower laminates at the points at which the respective suspension rings are disposed around said peripheral member.

3. A cargo net including in combination a peripheral member, a plurality of intersecting net mesh members secured to and carried by said peripheral member, each of said mesh members being formed of woven nylon webbing and formed with a plurality of longitudinally extending openings substantially uniformly spaced along the length of the webbing, a first group of said net mesh members extending parallel to each other, a second group of said net mesh members extending at an angle to said first net mesh members and parallel to each other, each of the net mesh members of the first group extending through the openings of alternate net mesh members of the second group and the net mesh members of the second group extending through the openings of alternate net mesh members of the first group, the construction being such that in the direction of the length of any net mesh member that net mesh member alternately passes through openings of alternate members of the other group which it intersects and has members of the other group passing through its openings and means for securing said net mesh members to each other at the points of the intersection.

4. A cargo net including in combination a peripheral member formed of woven nylon webbing, a plurality of intersecting net mesh members secured to and carried by said peripheral member, each of said mesh members being formed of woven nylon webbing and formed with a plurality of longitudinally extending openings substantially uniformly spaced along the length of the webbing, a first group of said net mesh members extending parallel to each other, a second group of said net mesh members extending at an angle to said first net mesh members and parallel to each other, each of the net mesh members of the first group extending through the openings of alternate net mesh members of the second group and the net mesh members of the second group extending through the openings of alternate net mesh members of the first group, the construction being such that in the direction of the length of any net mesh member that net mesh member alternately passes through openings of alternate members of the other group which it intersects and has members of the other group passing through its openings and means for securing said net mesh members to each other at the points of intersection.

References Cited in the file of this patent

UNITED STATES PATENTS

| | | |
|---|---|---|
| 791,325 | Cutter | May 30, 1905 |
| 819,576 | McCabe | May 1, 1906 |
| 1,188,185 | Krulish | June 20, 1916 |
| 1,365,511 | Lee | Jan. 11, 1921 |
| 1,781,458 | Gore | Nov. 11, 1930 |
| 1,827,447 | Wilmore | Oct. 13, 1931 |
| 2,260,052 | Passavant | Oct. 21, 1941 |
| 2,289,802 | Norton | July 14, 1942 |
| 2,402,709 | Swasey | June 25, 1946 |
| 2,475,588 | Bierman | July 12, 1949 |
| 2,551,044 | Ottinger et al. | May 1, 1951 |

FOREIGN PATENTS

| | | |
|---|---|---|
| 4,143 | Austria | Dec. 1, 1900 |
| 826,183 | Germany | Dec. 27, 1951 |
| 316,765 | Great Britain | Aug. 8, 1929 |
| 673,653 | Great Britain | June 11, 1952 |
| 607,325 | France | Mar. 26, 1926 |
| 697,189 | France | Oct. 27, 1930 |
| 1,033,803 | France | Apr. 8, 1953 |
| 288,862 | Italy | Sept. 25, 1931 |
| 68,169 | Norway | Sept. 9, 1943 |
| 74,495 | Norway | Mar. 8, 1948 |